United States Patent
Liang et al.

(10) Patent No.: US 9,024,270 B1
(45) Date of Patent: May 5, 2015

(54) GAMMA IMAGING PROBE POSITION SIGNAL PROCESSING METHOD

(71) Applicant: Institute of Nuclear Energy Research Atomic Energy Council, Executive Yuan, Taoyuan County (TW)

(72) Inventors: Hsin-Chin Liang, Taoyuan County (TW); Meei-Ling Jan, Taoyuan County (TW); Ching-Wei Kuo, Taoyuan County (TW)

(73) Assignee: Institute of Nuclear Energy Research Atomic Council, Executive Yuan, Taoyuan County (TW)

( * ) Notice: Subject to any disclaimer, the term of this patent is extended or adjusted under 35 U.S.C. 154(b) by 0 days.

(21) Appl. No.: 14/309,675

(22) Filed: Jun. 19, 2014

(30) Foreign Application Priority Data

Oct. 25, 2013 (TW) .............................. 102138705 A

(51) Int. Cl.
*G06T 7/00* (2006.01)
*G01T 1/17* (2006.01)
*H04N 5/32* (2006.01)
*H04N 5/378* (2011.01)

(52) U.S. Cl.
CPC ............... *G06T 7/0048* (2013.01); *H04N 5/32* (2013.01); *H04N 5/378* (2013.01)

(58) Field of Classification Search
CPC ....... G01T 1/161; G01T 1/1648; G06T 7/048; H04N 5/32; H04N 5/378
USPC ........................... 250/363.03, 363.04, 370.09
See application file for complete search history.

(56) References Cited

U.S. PATENT DOCUMENTS

| | | | |
|---|---|---|---|
| 2008/0230705 A1* | 9/2008 | Rousso et al. | 250/363.04 |
| 2009/0078875 A1* | 3/2009 | Rousso et al. | 250/363.04 |
| 2013/0334429 A1* | 12/2013 | Fukuchi et al. | 250/363.03 |
| 2014/0249402 A1* | 9/2014 | Kimchy et al. | 600/411 |

* cited by examiner

*Primary Examiner* — Mark R Gaworecki
(74) *Attorney, Agent, or Firm* — Muncy, Geissler, Olds & Lowe, P.C.

(57) ABSTRACT

The present invention based on not changing hardware design, which means that each imaging detector keep independent considerations, the weighted value of the circuit to be pushed back the weight of the original signal, and then estimate the amount of the original signal in a virtual cascade circuit to renew weighted signal; this estimation process through simplification, only simple addition and multiplication calculations on real numbers need to be implemented. Advantage of the present invention is that the signal data through a simple operation will complete the estimate. Executing the estimate in hardware without increasing storage capacity of the rear-end list mode data, and also to achieve a continuous and effective imaging area to expand and enhance the probe's sensitivity and keep a higher signal to noise ratio (S/N ratio).

9 Claims, 4 Drawing Sheets

GAMMA IMAGING PROBE POSITION SIGNAL PROCESSING METHOD

FIELD OF THE INVENTION

The present invention relates to a gamma imaging probe position signal processing method, more particularly, to a gamma imaging probe position signal processing method for correctly retaining the information of position of the signal of the event occurred in a signal sharing area of two adjacent image detector, so as to avoid the problem of large area of image being separated discontinuously.

BACKGROUND OF THE INVENTION

In design, the gamma imaging probe is made of scintillator array coupled to photo multipliers or array, which is in an application of pixelated in operation, and with dedicated read-out circuit, to obtain the position of X, Y and the intensity E of the signal in the image detector.

A practical imaging probe should be capable of detecting the entire area of the object being detected. However, because of the size of a single photo multiplier, the area is therefore limited. To overcome such constraints, a plurality of imaging detector is combined to be a larger size imaging probe to cover more area being detected. A larger size imaging probe, as shown in FIG. 5, basically is a series of combination of many single-size imaging detectors side-by-side to get the detecting-area multiply, however, it comes out with a problem that the event signal occurred in the adjacent area being conducted to two or more imaging detectors. Due to the independence of the detectors, the incomplete signals of those triggering detectors result in, as shown in FIG. 8, the consolidation area crystals can not respond correctly, thus, cause the entire imaging area be discontinuously separated. The crystal response map as shown in FIG. 6 is obtained with the technology in the prior art, as seem, the image is seriously discontinuous and can not be used in practice.

To improve the disadvantage described above, the technology employed in the prior art is to cascade the detector read-outs to get the detector signal sharing between two detectors, since the signals regain complete, the information of position of the event occurred in a cross-detector area of two adjacent image detector is correctly retained, so as to avoid the problem of large area of image being separated discontinuously. However, such solution cause the single area of image over-sized and increase the possibilities of occurrence of multiple events at a same time, result in the problems of signals being piled-up, increase of Dead Time and decrease of sensitivity of the imaging probe. In addition, many series combination of circuit logic in the readouts circuits also result in the decrease of SNR of the weighted circuit and poor quality of signal, eventually, cause the poor sensitivities and poor resolution of the image probe, and further impact the operation efficiency and quality of the instrument.

The technology employed in the prior art is to cascade the detector readouts to get the detector signal sharing between two detectors, which solve the problem of discontinuity and result in the destruction of the independence of each detector to become a larger detector device in series, but cause the problem of increase Dead Time of imaging probe, decrease SNR, being poor resolution.

SUMMARY OF THE INVENTION

The present invention has several unique technical features as follows.

(1). It combines several independent imaging detectors into a large area imaging probe, but still maintain the circuit independence of each single imaging detector, which means it keeps the sensitivity of each imaging probe and a higher signal to noise ratio (S/N ratio).

(2). The crystal response of the entire image-area (the probe effective detecting area) is continuous and identical pixelated, as shown in FIG. 7.

(3). When in real-time operation, only simple calculation of addition/multiplication applies, and such calculation can be implemented in the form of firmware built in a hardware system.

(4). It will not increase the loading of the software and the storage of list-mode data, thus decrease the complexity of the maintenance of the instrument.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

The present invention provides a position signal processing method for the gamma imaging probe. The gamma imaging probe disclosed in the method is a combination of a plurality of independent detectors. Each independent detector has the same structure of design, in which, each channel of signal is projected into two directions X and Y by branching or duplication. In X and Y direction there is L and N number of branch respectively. The signal branches in each direction are processed with its own weight model G for the calculation of addition/multiplication to obtain the two position signal with respect to each direction, that is, X+、X−、Y+ and Y−, which can be used to define a rectangle (i.e. the imaging area of a single imaging detector). Therefore, the weight model can be formulated as $G_{X+}=[G_1^{X+}、G_2^{X+}\ldots G_L^{X+}]$, $G_{X-}=[G_1^{X-}、G_2^{X-}\ldots G_L^{X-}]$, $G_{Y+}=[G_1^{Y+}、G_2^{Y+}\ldots G_N^{Y+}]$, and $G_{Y-}=[G_1^{Y-}、G_2^{Y-}\ldots G_N^{Y-}]$, which is a necessary condition when practicing the present invention.

The practice of the present invention comprises two sections, the first one is the estimation-model built-up section, and the second one is the application mode section.

Figure 1:
FIG. 1 is a schematic diagram showing l number of imaging detectors are combined with respect to the direction of x in an embodiment of the present invention.

As to the estimation-model built-up section, it comprises four steps. The first step is to reverse the original signal; the number of detectors is l when the combination of image detectors with respect to the X direction, as shown in FIG. 1.

The method of the present invention modifies the event occurred in the intersection area of the two adjacent image detectors, that is, for example, the intersection area of the m-th image detector and the (m+1)-th image detector, wherein, m=1 . . . l−1: that also means, the signal occurred simultaneously on the m detector in the branch L and the m+1 detector in the branch 1, therefore, the original signal of m-th detector in the branch L is $$_{m}^{0}S_{L}^{X} = \frac{X_{m}^{-}}{G_{L}^{X-}} + \frac{X_{m}^{+}}{G_{L}^{X+}},$$

and the original signal of the (m+1)-th detector on the branch 1 is $$_{m+1}^{0}S_{1}^{X} = \frac{X_{(m+1)}^{-}}{G_{1}^{X-}} + \frac{X_{(m+1)}^{+}}{G_{1}^{X+}}.$$

The second step is to build up the weight model for the virtual combined read-out circuit, which can be formulated based on the weight model of the original read-out circuit. The weight model of the combined l image detectors can be represented as $G_{X+}^{v}=[G_{1}^{X+} \cdot G_{2}^{X+} \ldots G_{L}^{X+} \cdot G_{(L+1)}^{X+} \ldots G_{mL}^{X+} \cdot G_{(mL+1)}^{X+} \ldots G_{lL}^{X+}]$, and $G_{X-}^{v}=[G_{1}^{X-} \cdot G_{2}^{X-} \ldots G_{L}^{X-} \cdot G_{(L+1)}^{X-} \ldots G_{mL}^{X-} \cdot G_{(mL+1)}^{X-} \ldots G_{lL}^{X-}]$.

The third step is to estimate the new weighted signal of the two branches in the virtual circuit, that is, the multiplication of the weight of the original signal and the weight of the virtual circuit, i.e.

$$S_{mL}^{X-} =_{m}^{0}S_{L}^{X} \times G_{mL}^{X+}, S_{mL}^{X+} =_{m}^{0}S_{L}^{X} \times G_{mL}^{X+},$$
$$S_{(mL+1)}^{X-} =_{(m+1)}^{0}S_{L}^{X} \times G_{(mL+1)}^{X-},$$
$$S_{(mL+1)}^{X+} =_{(m+1)}^{0}S_{L}^{X} \times G_{(mL+1)}^{X+}.$$

The forth step is to build up the final position signal of the virtual combined circuit, which is to estimate the mathematical formulation of the four position signal in each of the two original image detectors, wherein, the output signals of the virtual circuit are $X^{+}$, $X^{-}$, $Y^{+}$ and $Y^{-}$, and the output values from AC/DC converter of two original image detectors are $X_{m}^{+}, X_{m}^{-}, Y_{m}^{+}, Y_{m}^{-}, X_{(m+1)}^{+}, X_{(m+1)}^{-}, Y_{(m+1)}^{+}, Y_{(m+1)}^{-}$, and the signal of the virtual circuit with respect to the combined direction can be formulated as $$X^{+}=S_{mL}^{X+}+S_{(mL+1)}^{X+} \cdot X^{-}=S_{mL}^{X-}+S_{(mL+1)}^{X-},$$

and the signal of the virtual circuit with respect to the non-combined direction is the sum of the original signal of the two original image detector and is formulated as $Y^{+}=Y_{m}^{+}+Y_{(m+1)}^{+}, Y^{-}=Y_{m}^{-}+Y_{(m+1)}^{-}$.

In summary, the formulations in the last three steps, the new formulation (1) and (2) of the mathematical model for the estimation-mode built-up section can be obtained. The formulation (1) and (2) are as follows, $$\begin{cases} X^{+} = R_{1}X_{m}^{-} + R_{2}X_{m}^{+} + R_{3}X_{(m+1)}^{-} + R_{4}X_{(m+1)}^{+} \\ X^{-} = R_{5}X_{m}^{-} + R_{6}X_{m}^{+} + R_{7}X_{(m+1)}^{-} + R_{8}X_{(m+1)}^{+} \\ Y^{+} = Y_{m}^{+} + Y_{(m+1)}^{+} \\ Y^{-} = Y_{m}^{-} + Y_{(m+1)}^{-} \end{cases} \quad \text{formulation (1)}$$

wherein, $[R_{1} \ R_{2} \ R_{3} \ R_{4} \ R_{5} \ R_{6} \ R_{7} \ R_{8}] =$ $$\begin{bmatrix} \frac{G_{mL}^{X+}}{G_{L}^{X-}} & \frac{G_{mL}^{X+}}{G_{L}^{X+}} & \frac{G_{(mL+1)}^{X+}}{G_{1}^{X-}} & \frac{G_{(mL+1)}^{X+}}{G_{1}^{X+}} \\ \frac{G_{mL}^{X-}}{G_{L}^{X-}} & \frac{G_{mL}^{X-}}{G_{L}^{X+}} & \frac{G_{(mL+1)}^{X-}}{G_{1}^{X-}} & \frac{G_{(mL+1)}^{X-}}{G_{1}^{X+}} \end{bmatrix} \quad \text{formulation (2)}$$

Figure 2:
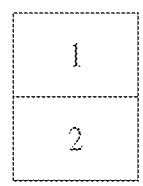
FIG. 2 is a schematic diagram showing n number of imaging detectors are combined with respect to the direction of y in an embodiment of the present invention.

With the same manner described above, when n number of image detectors are combined with respect to the Y direction, as shown in FIG. 2, the estimation-model for the event occurred in the intersection area of the k-th image detector and the (k+1)-th image detector can be expressed as $$\begin{cases} X^{+} = X_{k}^{+} + X_{(k+1)}^{+} \\ X^{-} = X_{k}^{-} + X_{(k+1)}^{-} \\ Y^{+} = R_{9}Y_{k}^{-} + R_{10}Y_{k}^{+} + R_{11}Y_{(k+1)}^{-} + R_{12}Y_{(k+1)}^{+} \\ Y^{-} = R_{13}Y_{k}^{-} + R_{14}Y_{k}^{+} + R_{15}Y_{(k+1)}^{-} + R_{16}Y_{(k+1)}^{+} \end{cases} \quad \text{formulation (3)}$$

wherein, $[R_{9} \ R_{10} \ R_{11} \ R_{12} \ R_{13} \ R_{14} \ R_{15} \ R_{16}] =$ $$\begin{bmatrix} \frac{G_{mN}^{Y+}}{G_{N}^{Y-}} & \frac{G_{mN}^{Y+}}{G_{N}^{Y+}} & \frac{G_{(mN+1)}^{Y+}}{G_{1}^{Y-}} & \frac{G_{(mN+1)}^{Y+}}{G_{1}^{Y+}} \\ \frac{G_{mN}^{Y-}}{G_{N}^{Y-}} & \frac{G_{mN}^{Y-}}{G_{N}^{Y+}} & \frac{G_{(mN+1)}^{Y-}}{G_{1}^{Y-}} & \frac{G_{(mN+1)}^{Y-}}{G_{1}^{Y+}} \end{bmatrix} \quad \text{formulation (4)}$$

Figure 3:
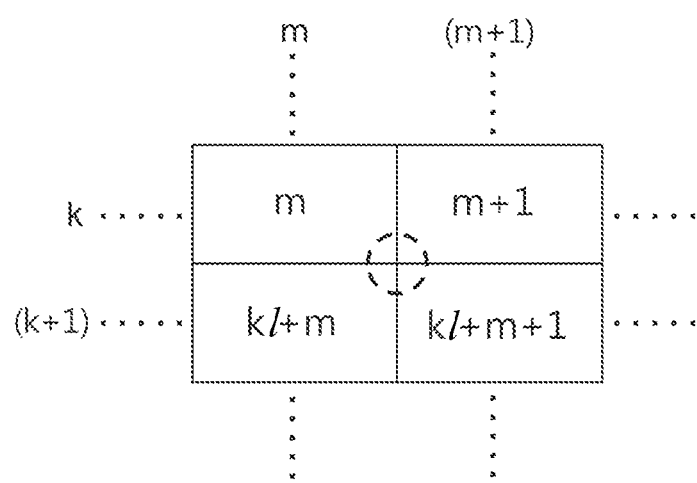
FIG. 3 is a schematic diagram showing the four intersections of l*n number of imaging detectors in an embodiment of the present invention.

In a special condition, when the event occurred in the intersection of any four image detectors, as shown in FIG. 3. In a image probe formed with l*n image detectors, and the events occurred in the intersection of the four image detectors by the columns m and m+1 with respect to the direction X and the rows k and k+1 with respect to the direction Y, wherein, m=1 . . . l−1, while k=1 . . . n−1. The estimation-model of the position signals of the virtual circuit can be expressed as $$\begin{cases} X^{+} = R_{1}(X_{m}^{-} + X_{(kl+m)}^{-}) + R_{2}(X_{m}^{+} + X_{(kl+m)}^{+}) + \\ \quad R_{3}(X_{(m+1)}^{-} + X_{(kl+m+1)}^{-}) + R_{4}(X_{(m+1)}^{+} + X_{(kl+m+1)}^{+}) \\ X^{-} = R_{5}(X_{m}^{-} + X_{(kl+m)}^{-}) + R_{6}(X_{m}^{+} + X_{(kl+m)}^{+}) + \\ \quad R_{7}(X_{(m+1)}^{-} + X_{(kl+m+1)}^{-}) + R_{8}(X_{(m+1)}^{+} + X_{(kl+m+1)}^{+}) \\ Y^{+} = R_{9}(Y_{m}^{-} + Y_{(m+1)}^{-}) + R_{10}(Y_{m}^{+} + Y_{(m+1)}^{+}) + \\ \quad R_{11}(Y_{(kl+m)}^{-} + Y_{(kl+m+1)}^{-}) + R_{12}(Y_{(kl+m)}^{+} + Y_{(kl+m+1)}^{+}) \\ Y^{-} = R_{13}(Y_{m}^{-} + Y_{(m+1)}^{-}) + R_{14}(Y_{m}^{+} + Y_{(m+1)}^{+}) + \\ \quad R_{15}(Y_{(kl+m)}^{-} + Y_{(kl+m+1)}^{-}) + R_{16}(Y_{(kl+m)}^{+} + Y_{(kl+m+1)}^{+}) \end{cases} \quad \text{formulation (5)}$$

wherein, $[R_{1} \ R_{2} \ldots R_{8}]$ is same as that in formulation (2), $[R_{9} \ R_{10} \ldots R_{16}]$ is same as that in formulation (4).

Figure 4:
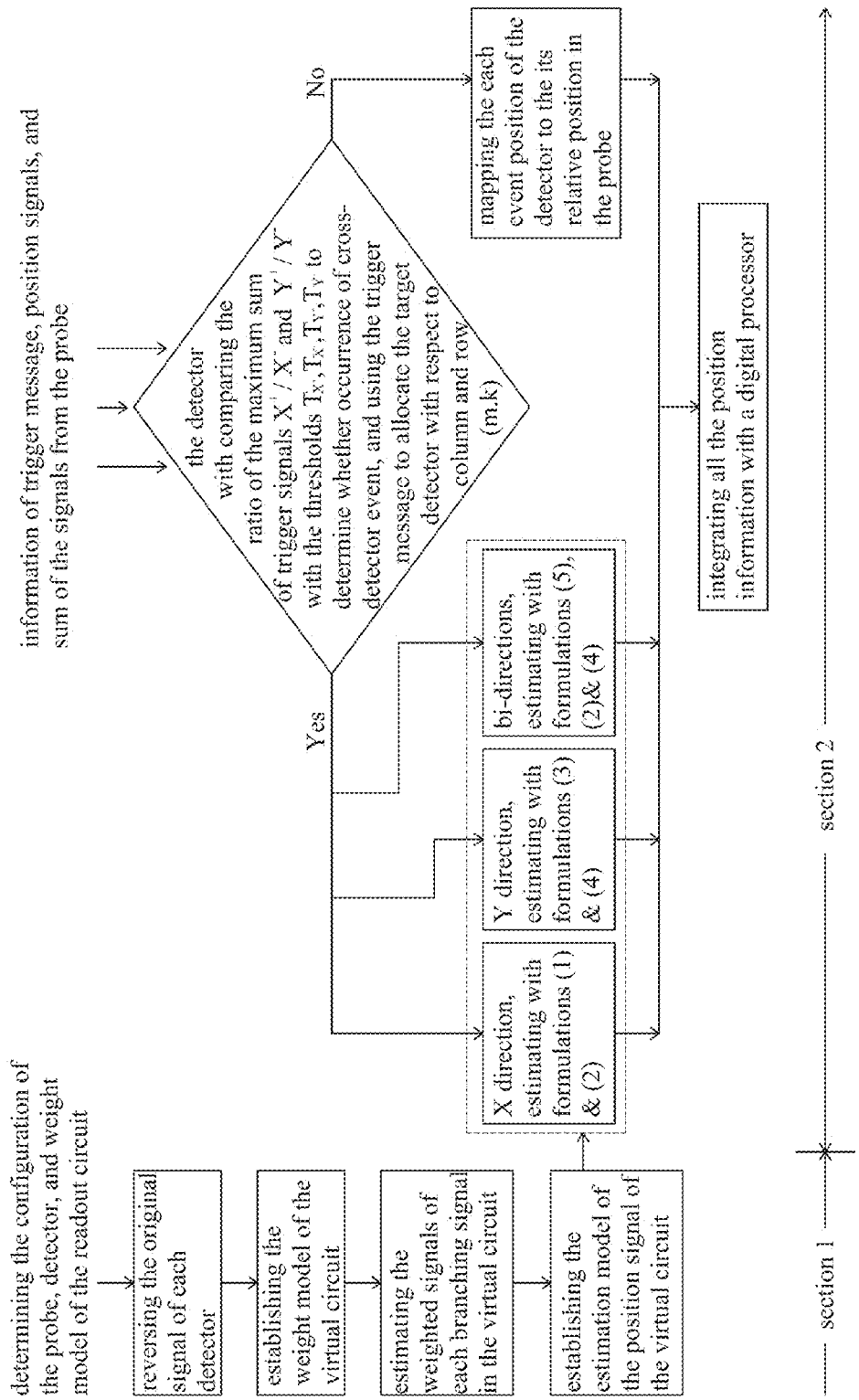
FIG. 4 is a schematic diagram showing the signal process flow of the gamma imaging probe for position signal processing method of the present invention.

The second section is the application mode section, which applies the formulation modules established in the first section—estimation-model built-up section in the practice of the probe. As shown in FIG. 4, the first step of the application mode section is to screening of the events, that is, when the gamma-event occurred in the probe, the probe generates a trigger message, position signals and the sum of signals (as the gamma energy). Ideal situation is that only one image detector in the probe is transmitting the trigger message, but if the event occurred in the area cross to the other image detector and needs modification, more image detectors are transmitting trigger messages, thus, the modification will proceed based on the image detector that is transmitting the maximum sum of signals. To proceed, the ratio X+/ X− is established based on the position signals of the image detector with respect to X direction to determine whether the ratio is greater than the value $T_{X-}$ or smaller than the value $T_{X+}$; $T_{X+}$ and $T_{X-}$ are determined by the weight of the read-out circuit of each image detector, wherein, $T_{X+}=G_{L-1}^{X+}/G_2^{X+}$, $T_{X-}=G_{L-1}^{X-}/G_2^{X-}$; if X+/X−>$T_{X+}$ is true, meaning the cross-detector event occurred with respect to the X direction. Following the number of position indicating in the trigger message transmitting from the image detector will lead to the column m in the image detector array, and the next position adjacent to the column m with respect to direction X+ is the (m+1)-th image detector. If X+/X−<$T_{X-}$ is true, meaning the cross-detector event occurred with respect to the X direction. Following the number of position indicating in the trigger message transmitting from the image detector will lead to the column m+1 in the image detector array, and the last position adjacent to the column m+1 with respect to direction X− is the m-th image detector. Same manner, the ratio Y+/Y− is established for determination, wherein, $T_{Y+}=G_{N-1}^{Y+}/G_2^{Y+}$, $T_{Y-}=G_{N-1}^{Y-}/G_2^{Y-}$; if Y+/Y−>$T_{Y+}$ is true, meaning the cross-detector event occurred with respect to the Y direction. Following the number of position indicating in the trigger message transmitting from the image detector will lead to the row k in the image detector array, and the next position adjacent to the row k with respect to direction Y+ is the (k+1)-th image detector. If Y+/Y−<$T_{Y-}$ is true, meaning the cross-detector event occurred with respect to the Y direction. Following the number of position indicating in the trigger message transmitting from the image detector will lead to the row k+1 in the image detector array, and the last position adjacent to the column k+1 with respect to direction Y− is the k-th image detector.

The second step of the section is, based on the result from the first step, to modify the event occurred with the formulation derived from the first section. If the cross-detector event occurred in the direction X, the formulations (1) and (2) apply, while the cross-detector event occurred with respect to the direction Y, the formulations (3) and (4) apply. If the cross-detector event occurred with respect to the both directions X and Y, the formulations (5), (2) and (4) apply. If all the determinations in the first step are not true, meaning no cross-detector event occurred, the each corresponding position signal in the probe (image detector array) will be used as the correct mapping for its relative position in the entire probe, which is common and obvious in the prior art.

The last step of the section is to transmit all the position signals, no matter whether cross-detector or not, to a digital processor for further process.

Figure 5:
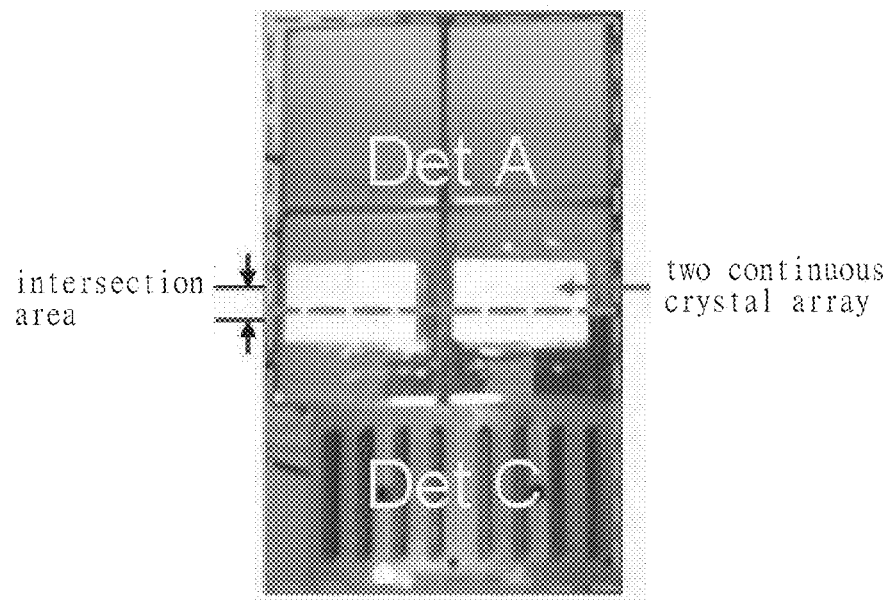
FIG. 5 is a schematic diagram showing the testing installation of the combination of two image detectors in an embodiment of the present invention.

One of the embodiments according to the present invention is illustrated in FIG. 5, in which, two image detectors (Det. A & Det. C) are combined with respect to the direction X, each image detector has its own independent read-out circuit. In the direction X, there are 16 branches signals (L=16), while in the direction Y, there are 12 branches signals (N=12). Four position signals X+, X−, Y+, Y− for each detectors are built up by the combination based on the weight model of each direction, wherein, the weight model of the direction Y is $G_y^+$= [0.5ˋ1ˋ1.5ˋ2ˋ2.5ˋ3ˋ3.5ˋ4ˋ4.5ˋ5ˋ5.5 ˋ6] ˋ$G_y^-$= [6ˋ5.5ˋ5ˋ4.5 ˋ4ˋ3.5ˋ3ˋ2.5ˋ2ˋ1.5ˋ1ˋ0.5], and the combined row is k=1 (i.e. Det A) and (k+1)=2 (i.e. Det C) The weight model of the virtual combined circuit can be $G_{Y+}^v$=[0.5ˋ1ˋ1.5ˋ2ˋ2.5ˋ3ˋ3.5ˋ4ˋ4.5ˋ5ˋ5.5ˋ6ˋ 6.5ˋ7ˋ7.5ˋ8ˋ8.5ˋ9ˋ9.5ˋ10ˋ10.5ˋ11ˋ11.5ˋ 12]ˋ$G_{Y-}^v$=[12ˋ11.5ˋ11ˋ10.5ˋ10ˋ9.5ˋ9ˋ8.5ˋ8ˋ7.5ˋ 7ˋ6.5ˋ6ˋ5.5ˋ5ˋ4.5ˋ4ˋ3.5ˋ3ˋ2.5ˋ2ˋ1.5ˋ1ˋ0.5]. Therefore, the model of the estimated position signals of the virtual circuit established based on the eight position signals $X_1^+$, $X_1^-$, $Y_1^+$, $Y_1^-$, $X_2^+$, $X_2^-$, $Y_2^+$, $Y_2^-$ of the Det. A and Det. C can be expressed as follows, $$\begin{cases} X^+ = X_1^+ + X_2^+ \\ X^- = X_1^- + X_2^- \\ Y^+ = 12Y_1^- + Y_1^+ + 1.0833Y_2^- + 13Y_2^+ \\ Y^- = 13Y_1^- + 1.0833Y_1^+ + Y_2^- + 12Y_2^+ \end{cases}$$

Figure 6:
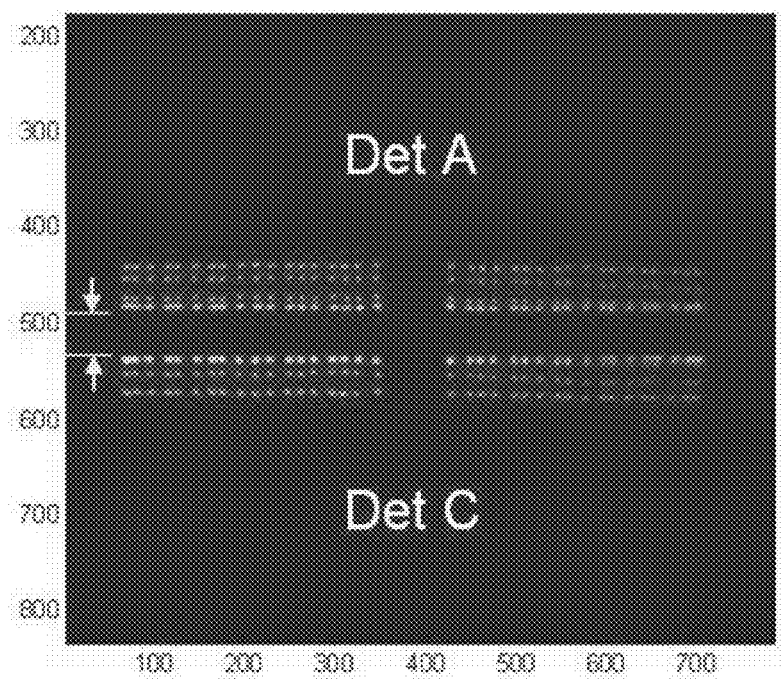
FIG. 6 is a schematic diagram showing the crystal response map not using the method of the present invention.
Figure 7:
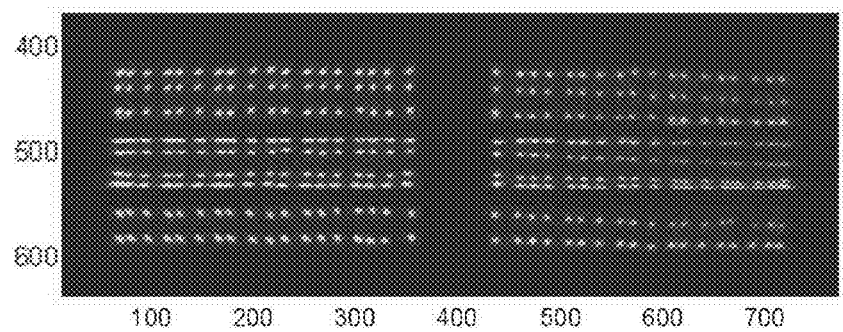
FIG. 7 is a schematic diagram showing the crystal response map using the method of the present invention.
Figure 8:
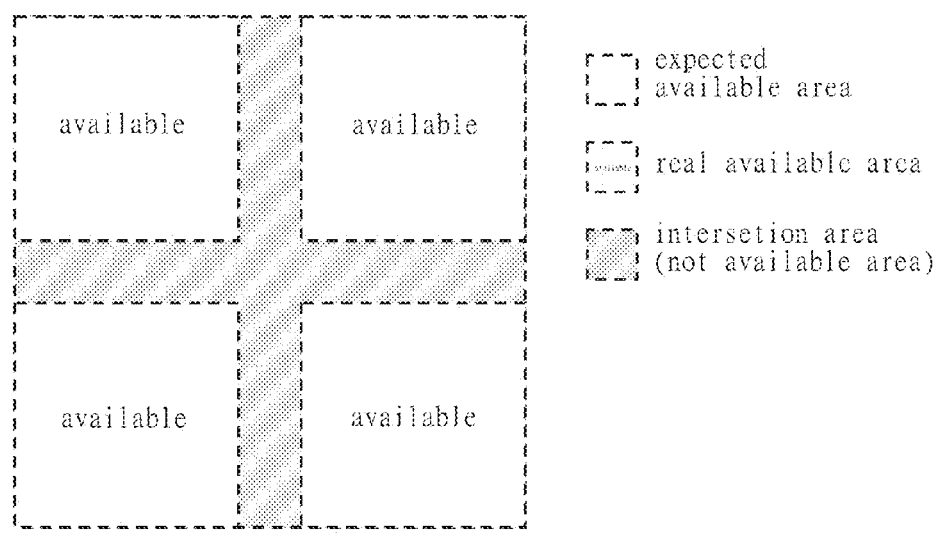
FIG. 8 is a schematic diagram showing the area being expected by the four-combined image detectors in an embodiment of the present invention.

As shown in FIG. 5, there are two adjacent crystal arrays formed in the intersection area of two image detectors, as seem in the diagram, the crystals in the intersection area of the two image detectors did not respond correctly without employing the present invention, which causes the utilization lost of the signals, as shown in FIG. 6. However, after employing the present invention, the crystals lying in the intersection area of the two image detectors are perfectly correct and thus a continuous and resolution-identical image is produced.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A position signal processing method for gamma imaging probe, comprising;
   a step of establishing estimation-model built-up section; and
   a step of establishing an application mode section, wherein, the gamma imaging probe is a combination of a plurality of independent detectors, each independent detector has same structure in design, in which, each channel of signal is equally-divided or duplicated into two directional signal branches X and Y, and thus in X and Y direction there is its own L and N number of branch respectively, the signal branches in each direction are processed with its own weight model G for the calculation of addition/multiplication to obtain the two position signal with respect to each direction, that is, X+, X−, Y+ and Y−, which can be used to define a rectangular image area, therefore, the weight model can be formulated as $G_{X+}$=[$G_1^{X+}$ˋ$G_2^{X+}$. . . $G_L^{X+}$], $G_{X-}$=[$G_1^{X-}$ˋ$G_2^{X-}$... $G_L^{X-}$], $G_{Y+}$=[$G_1^{Y+}$ˋ$G_2^{Y+}$... $G_N^{Y+}$] and $G_{Y-}$= [$G_1^{Y-}$ˋ$G_2^{Y-}$... $G_N^{Y-}$].

2. The position signal processing method for gamma imaging probe of claim 1, wherein, the estimation-model built-up section is to determine the specification of the probe, the detectors and the weighted circuit, the method of the section comprising:
   revering the original un-weighted signals of each image detector;
   establishing a weighted-model for a virtual circuit;
   estimating branching weighted signals in the two sides of each intersection area of the virtual circuit; and
   establishing estimation model for the position signal in the virtual circuit.

3. The position signal processing method for gamma imaging probe of claim 2, wherein, when combining/number of image detectors with respect to the X direction, the step of revering the original un-weighted signals of each image detector is to modify the event that occurred in the merged area of two image detector, that is, the merged area of the m-th image detector and the (m+1)-th image detector, wherein the m=1 . . . l−1, meaning the signal occurred simultaneously on the m-th detector in the branch L and the (m+1)-th detector in the branch 1, therefore, the original signal of the m-th detector in the branch L is $$_m^0S_L^X = \frac{X_m^-}{G_L^{X-}} + \frac{X_m^+}{G_L^{X+}},$$

wherein $X_m^-$ and $X_m^+$ are the signal of the m-th detector with respect to the direction X output from an AC/DC converter, and the original signal of the (m+1)-th detector on the branch 1 is $$_{m+1}^0S_1^X = \frac{X_{(m+1)}^-}{G_1^{X-}} + \frac{X_{(m+1)}^+}{G_1^{X+}},$$

wherein $X_{(m+1)}^-$ and $X_{(m+1)}^+$ are the signals of the (m+1)-th detector with respect to the direction X output from the AC/DC converter.

4. The position signal processing method for gamma imaging probe of claim 2, wherein, the step of establishing a weight model for a virtual circuit is to combine 1 image detectors with respect to the direction X, the weight model of the combined 1 image detectors can be represented as $G_{X+}^v = [G_1^{X+}, G_2^{X+} \ldots G_L^{X+}, G_{(L+1)}^{X+} \ldots G_{mL}^{X+}, G_{(mL+1)}^{X+} \ldots G_{lL}^{X+}]$, and $G_{X-}^v = [G_1^{X-}, G_2^{X-} \ldots G_L^{X-}, G_{(L+1)}^{X-} \ldots G_{mL}^{X-}, G_{(mL+1)}^{X-} \ldots G_{lL}^{X-}]$.

5. The position signal processing method for gamma imaging probe of claim 2, wherein, the step of estimating branching weighted signals in the two sides of each intersection area of the virtual circuit is to multiple the weight of the original signal and the weight of the virtual circuit, which can be expressed as $S_{mL}^{X-} = {}_m^0S_L^X \times G_{mL}^{X+};$
$S_{mL}^{X+} = {}_m^0S_L^X \times G_{mL}^{X+};$
$S_{(mL+1)}^{X-} = {}_{(m+1)}^0S_L^X \times G_{(mL+1)}^{X-};$
$S_{(mL+1)}^{X+} = {}_{(m+1)}^0S_L^X \times G_{(mL+1)}^{X+}.$ 6. The position signal processing method for gamma imaging probe of claim 2, wherein, the step of establishing estimation model for the position signal in the virtual circuit is to build up the final position signal of the virtual combined circuit, which is to estimate the mathematical formulation of the four position signal in each of the two original image detectors, wherein, the output signals of the virtual circuit are $X^+, X^-, Y^+$ and $Y^-$, and the output signals of AC/DC converter of two original image detectors are $X_m^+, X_m^-, Y_m^+, Y_m^-, X_{(m+1)}^+, X_{(m+1)}^-, Y_{(m+1)}^+$, and $Y_{(m+1)}^-$, and the signal of the virtual circuit with respect to the combined direction can be formulated as $X^+ = S_{mL}^{X+} + S_{(mL+1)}^{X+}, X^- = S_{mL}^{X-} + S_{(mL+1)}^{X-}$, and the signal of the virtual circuit with respect to the non-combined direction is the sum of the original signal of the two original image detector and is formulated as $Y^+ = Y_m^+ + Y_{(m+1)}^+, Y^- = Y_m^- + Y_{(m+1)}^-$, and consolidating the steps of revering the original un-weighted signals of each image detector, the step of establishing a weight model for a virtual circuit is to combine l image detectors with respect to the direction X and the step of estimating branching weighted signals in the two sides of each intersection area of the virtual circuit to obtain new formulation (1) and (2) for the combination l image detectors with respect to the direction X, the formulation (1) and (2) are as follows, $$\begin{cases} X^+ = R_1X_m^- + R_2X_m^+ + R_3X_{(m+1)}^- + R_4X_{(m+1)}^+ \\ X^- = R_5X_m^- + R_6X_m^+ + R_7X_{(m+1)}^- + R_8X_{(m+1)}^+ \\ Y^+ = Y_m^+ + Y_{(m+1)}^+ \\ Y^- = Y_m^- + Y_{(m+1)}^- \end{cases} \quad \text{formulation (1)}$$

wherein, $[R_1 \ R_2 \ R_3 \ R_4 \ R_5 \ R_6 \ R_7 \ R_8] =$ $$\begin{bmatrix} \frac{G_{mL}^{X+}}{G_L^{X-}} & \frac{G_{mL}^{X+}}{G_L^{X+}} & \frac{G_{(mL+1)}^{X+}}{G_1^{X-}} & \frac{G_{(mL+1)}^{X+}}{G_1^{X+}} \\ \frac{G_{mL}^{X-}}{G_L^{X-}} & \frac{G_{mL}^{X-}}{G_L^{X+}} & \frac{G_{(mL+1)}^{X-}}{G_1^{X-}} & \frac{G_{(mL+1)}^{X-}}{G_1^{X+}} \end{bmatrix} \quad \text{formulation (2)}$$

and when n number of image detectors are combined with respect to the Y direction, the estimation-model for the event occurred in the intersection area of the k-th image detector and the (k+1)-th image detector can be expressed as $$\begin{cases} X^+ = X_k^+ + X_{(k+1)}^+ \\ X^- = X_k^- + X_{(k+1)}^- \\ Y^+ = R_9Y_k^- + R_{10}Y_k^+ + R_{11}Y_{(k+1)}^- + R_{12}Y_{(k+1)}^+ \\ Y^- = R_{13}Y_k^- + R_{14}Y_k^+ + R_{15}Y_{(k+1)}^- + R_{16}Y_{(k+1)}^+ \end{cases}; \quad \text{formulation (3)}$$

wherein, $[R_9 \ R_{10} \ R_{11} \ R_{12} \ R_{13} \ R_{14} \ R_{15} \ R_{16}] =$ $$\begin{bmatrix} \frac{G_{mN}^{Y+}}{G_N^{Y-}} & \frac{G_{mN}^{Y+}}{G_N^{Y+}} & \frac{G_{(mN+1)}^{Y+}}{G_1^{Y-}} & \frac{G_{(mN+1)}^{Y+}}{G_1^{Y+}} \\ \frac{G_{mN}^{Y-}}{G_N^{Y-}} & \frac{G_{mN}^{Y-}}{G_N^{Y+}} & \frac{G_{(mN+1)}^{Y-}}{G_1^{Y-}} & \frac{G_{(mN+1)}^{Y-}}{G_1^{Y+}} \end{bmatrix}, \quad \text{formulation (4)}$$

and in a condition that a image probe formed with l×n image detectors, and the events occurred in the intersection of the four image detectors by the columns m and m+1 with respect to the direction X and the rows k and k+1 with respect to the direction Y, wherein, m=1 . . . l−1, while k=1 . . . n−1, the estimation-model of the position signals of the virtual circuit can be expressed as $$\begin{cases} X^+ = R_1(X_m^- + X_{(kl+m)}^-) + R_2(X_m^+ + X_{(kl+m)}^+) + \\ \quad R_3(X_{(m+1)}^- + X_{(kl+m+1)}^-) + R_4(X_{(m+1)}^+ + X_{(kl+m+1)}^+) \\ X^- = R_5(X_m^- + X_{(kl+m)}^-) + R_6(X_m^+ + X_{(kl+m)}^+) + \\ \quad R_7(X_{(m+1)}^- + X_{(kl+m+1)}^-) + R_8(X_{(m+1)}^+ + X_{(kl+m+1)}^+) \\ Y^+ = R_9(Y_m^- + Y_{(m+1)}^-) + R_{10}(Y_m^+ + Y_{(m+1)}^+) + \\ \quad R_{11}(Y_{(kl+m)}^- + Y_{(kl+m+1)}^-) + R_{12}(Y_{(kl+m)}^+ + Y_{(kl+m+1)}^+) \\ Y^- = R_{13}(Y_m^- + Y_{(m+1)}^-) + R_{14}(Y_m^+ + Y_{(m+1)}^+) + \\ \quad R_{15}(Y_{(kl+m)}^- + Y_{(kl+m+1)}^-) + R_{16}(Y_{(kl+m)}^+ + Y_{(kl+m+1)}^+) \end{cases}, \quad \text{formulation (5)}$$

wherein, $[R_1 \ R_2 \ldots R_8]$ is same as that in formulation (2), $[R_9 \ R_{10} \ldots R_{16}]$ is same as that in formulation (4).

7. The position signal processing method for gamma imaging probe of claim 6, wherein, the step (2) of establishing an application mode section is, based on the result from the step (1), to modify the event occurred in the two- or four-detector intersection area with the formulation driven from the estimation-model built-up section, if the cross-detector event occurred with respect to the direction X, the formulations (1) and (2) apply, while the cross-detector event occurred with respect to the direction Y, the formulations (3) and (4) apply, if the cross-detector event occurred with respect to both directions X and Y, the formulations (5), (2) and (4) apply.

8. The position signal processing method for gamma imaging probe of claim 1, wherein, the step of establishing a application mode section is to apply the estimation-model built in the estimation-model built-up section to the probe and the modification of cross-detector events, wherein, the step of establishing an application mode section comprising:
   step (1): using trigger message , position signals, and sum of signals generating from the probe to obtain the ratio of $X^+/X^-$ and $Y^+/Y^-$ from the detector showing the maximum sum of signals, to compare with thresholds $T_{X+}$, $T_{X-}$, $T_{Y+}$ and $T_{Y-}$ to determine the occurrence of the cross-detector event, and then using trigger message to determine the column and row number (m, k) of a target image detector;
   step (2): when a cross-detector event occurred, using the estimation model to modify the event occurred in the two-or four-detector intersection area;
   step (3): when no cross-detector event occurred, mapping each corresponding position to its relative position in the entire probe; and
   step (4): using a digital processor to combine whole the info nation from the step (2) and (3) to form a gamma image position response of the probe.

9. The position signal processing method for gamma imaging probe of claim 8, wherein, the step (1) of establishing an application mode section is to determine the occurrence of cross-detector event, if noinial event occurred, only one of the image detectors in the probe transmits trigger message, position signals and sum of signals, if the cross-detector event occurred, a plurality of (two or four) image detectors in the probe transmit trigger messages, position signals and sums of signals, then the image detector with the maximum sum of signals is used for determination, a ratio $X_+/X_-$ is established based on the position signals of the image detector with respect to X direction to determine whether the ratio is greater than the threshold value $T_{X+}$ or smaller than the threshold value $T_{X-}$; $T_{X+}$ and $T_{X-}$ are determined by the weight of the read-out circuit of each image detector, wherein, $T_{X+}=G_{L-1}^{X+}/G_2^{X+}$, $T_{X-}=G_{L-1}^{X-}/G_2^{X-}$; if $X_+/X_->T_{X+}$ is true, meaning the cross-detector event occurred with respect to the X direction, following the number of position indicating in the trigger message transmitting from the image detector leads to the column m in the image detector array, and the next position adjacent to the column m with respect to direction $X_+$ is the (m+1)-th image detector, if $X_+/X_-<T_{X+}$ is true, meaning the cross-detector event occurred with respect to the X direction, following the number of position indicating in the trigger message transmitting from the image detector leads to the column m+1 in the image detector array, and the last position adjacent to the column m+1 with respect to direction $X_-$ is the m-th image detector, the ratio $Y_+/Y_-$ is established for determination, wherein, $T_{Y+}=G_{N-1}^{Y+}/G_2^{Y+}$, $T_{Y-}=G_{N-1}^{Y-}/G_2^{Y-}$; if $Y_+/Y_->T_{Y+}$ is true, meaning the cross-detector event occurred with respect to the Y direction, following the number of position indicating in the trigger message transmitting from the image detector leads to the row k in the image detector array, and the next position adjacent to the row k with respect to direction $Y_+$ is the (k+1)-th image detector, if $Y_+/Y_-<T_{Y+}$ is true, meaning the cross-detector event occurred with respect to the Y direction, following the number of position indicating in the trigger message transmitting from the image detector leads to the row k+1 in the image detector array, and the last position adjacent to the column k+1 with respect to direction Y− is the k-th image detector.

* * * * *